US008340614B2

(12) United States Patent
Rosener et al.

(10) Patent No.: US 8,340,614 B2
(45) Date of Patent: Dec. 25, 2012

(54) ANTENNA DIVERSITY TO IMPROVE PROXIMITY DETECTION USING RSSI (75) Inventors: Douglas Kenneth Rosener, Santa Cruz, CA (US); William Owen Brown, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 828 days.

(21) Appl. No.: 12/338,876

(22) Filed: Dec. 18, 2008

(65) Prior Publication Data

US 2010/0159840 A1 Jun. 24, 2010

(51) Int. Cl.
*H04B 17/00* (2006.01)

(52) U.S. Cl. ............... 455/226.2; 455/404.2; 455/414.2; 455/456.1; 455/67.11; 455/67.7

(58) Field of Classification Search ............... 455/404.2, 455/414.2, 456.1, 457, 437, 525, 67.11
See application file for complete search history.

(56) References Cited

U.S. PATENT DOCUMENTS

| 4,756,023 | A | * | 7/1988 | Kojima | 455/134 |
|---|---|---|---|---|---|
| 5,740,526 | A | * | 4/1998 | Bonta et al. | 455/277.2 |
| 6,931,081 | B2 | * | 8/2005 | Meijer et al. | 375/316 |
| 7,035,612 | B2 | * | 4/2006 | Kishimoto et al. | 455/277.1 |
| 7,149,480 | B2 | * | 12/2006 | Miyahara | 455/78 |
| 7,149,489 | B2 | * | 12/2006 | Hong | 455/269 |
| 7,162,261 | B1 | * | 1/2007 | Yarkosky et al. | 455/513 |
| 7,289,834 | B2 | * | 10/2007 | Sun et al. | 455/575.5 |
| 7,499,691 | B1 | * | 3/2009 | Dunn et al. | 455/277.2 |
| 7,515,874 | B2 | * | 4/2009 | Nikolajevic et al. | 455/41.2 |
| 7,684,838 | B2 | * | 3/2010 | Wilson | 455/575.9 |
| 7,742,754 | B2 | * | 6/2010 | Yahagi | 455/404.2 |
| 2003/0060178 | A1 | * | 3/2003 | Ghassemzadeh et al. | 455/277.1 |
| 2005/0227724 | A1 | * | 10/2005 | Tsai | 455/525 |
| 2008/0242220 | A1 | * | 10/2008 | Wilson et al. | 455/3.04 |
| 2008/0260169 | A1 | * | 10/2008 | Reuss | 381/58 |
| 2009/0149131 | A1 | * | 6/2009 | Young et al. | 455/67.7 |
| 2009/0258622 | A1 | * | 10/2009 | Ruijter | 455/226.3 |
| 2010/0156624 | A1 | * | 6/2010 | Hounsell | 340/539.1 |

* cited by examiner

*Primary Examiner* — Linh Nguyen
(74) *Attorney, Agent, or Firm* — Chuang Intellectual Property Law (57) ABSTRACT

A method and apparatus for determining proximity of a mobile radio relative to its base radio. Antenna diversity is utilized to provide improved proximity detection, such as NEAR state or FAR state, of the mobile radio relative to its base radio.

24 Claims, 7 Drawing Sheets

ANTENNA DIVERSITY TO IMPROVE PROXIMITY DETECTION USING RSSI

BACKGROUND OF THE INVENTION

One indicator of relative position between two radio communication devices is received radio signal strength. Often a number is assigned to this strength and is referred to as the received signal strength indication (RSSI). Most manufacturers who report RSSI generally estimate the received signal power at the antenna either by direct measurement, or digital signal processing, and report a monotonically increasing number with respect to this power. The number is often calibrated to track power linearly and report the value in dBm.

Received signal strength depends on transmit power level, the direct line of sight and reflection path distances between transmitter and receiver, and the phasing of any reflected radio waves received, where the reflected radio waves are referred to as multi-path. As the direct line of sight distance increases for a fixed transmit power, the received amplitude decreases in general, but can vary about in amplitude around this trend due to reflections. In some situations, the direct path is blocked and only reflections are received.

When the direct path is not blocked, relatively large decreases in received signal strength, referred to as signal "nulls" or "fades" can be caused by reflectors at or beyond the first Fresnel zone. Fresnel zones are ellipsoids with transmitter and receiver at the foci and surface defined by all paths that are an odd-multiple of a half-wavelength farther than the direct path between transmitter and receiver, causing cancellation, assuming that there is no phase shift at the reflector.

If the reflector is at an even multiple of a half-wavelength, the direct and reflected waves can constructively interfere (again, assuming no phase shift at the reflector), resulting in a signal "peak" where the received amplitude may be twice as large as the direct path alone. In general, accurate predictions of real situations are difficult, but one can state in general that the actual received signal strength indication can vary by +6 dB to −infinity depending on the reflector configuration. When the direct path is blocked, signal nulls can also occur, and generally RSSI will decrease with distance. Often one reflector dominates, and a simple analysis for direct path fading can be used.

In the prior art, a variety of means have been used to determine relative position between two radio devices. As described earlier, radio signal strength indication has been used to indicate relative location. The RSSI may have a monotonic non-linear relationship. A calibrated mapping could be made for relative distance versus RSSI. Other prior art techniques for relative location include the use of GPS, pulse time delay, and triangulation based on access points.

One advantage of RSSI is that it is usually accessible by software in a radio equipped device, being a measured quantity needed for dynamically optimizing radio system operation. No significant processing or additional components are required like GPS, pulse time delay and triangulation.

However, the use of RSSI to determine relative position may be problematic due to signal nulls resulting from multi-path. There also can be signal peaks due to multi-path, but these seldom have the large changes in signal strength seen by nulls. As a result, there is a need for improved methods and apparatuses for ranging between two radio devices.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for proximity determination using antenna diversity are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In communications, it may be desirable to know the relative position of a radio with respect to its communication base (also referred to herein as a "base station", "base unit", "base radio", or simply "base"). In one example application, this information is useful in systems related to "presence". The term presence generally refers to information about a user's ability or willingness to communicate. The concept of using presence in communication systems may be applied in instant messaging systems. Presence is also used in other network communication systems, such as the Microsoft Unified Communication Service. As applied to the field of headsets, presence information may include, for example, whether the headset is being worn by the user, the proximity of the user to the base station, other usage information related to the headset, and whether the user desires to be called.

In some applications, the position information required may be a NEAR/FAR binary state, namely either a closer proximity (referred to herein as a "near" or "NEAR" state) or relatively farther proximity (referred to herein as a "far" or "FAR" state), with the threshold between the two states set by the application. The terms "status" and "state" may be used interchangeably herein.

Determining a person's relative position to a base station is a useful input to establishing someone's presence. For example, it can indicate that a person is in audio range to hear an alarm, visual range to see a display, or just that they are in their work area as opposed to on break. This aspect of their presence can be reported back to a monitor, or provided to someone wishing to communicate with that person. In many cases all that may be needed is a crude measure of relative position; either the person is "NEAR" to or "FAR" from the base station or object of interest. The precise distance defined by a NEAR state or FAR state may be varied depending on the particular application.

This invention relates generally to proximity determination of a mobile radio relative to its base radio. The methods and systems described herein provide improved reliability in determining proximity between two radio devices, at least one of which is mobile. In one example, both the mobile radio and its base radio are wireless devices. Note that as used herein, the term "wireless device" only implies that the device can interact wirelessly with another wireless device. The wireless device may include wired functionality in addition to its wireless functionality, and it need not be a mobile device. For example, the wireless device may be a base radio for a wireless headset, the base radio being connected by a cable to another device such as, for example, a personal computer.

In one example, this description describes a method and apparatus for a determining NEAR or FAR state of a mobile radio, such as a headset, utilizing switching between two or more antennas. RSSI is measured for use by a NEAR/FAR application to indicate proximity as opposed to optimizing data throughput. In one example, a base radio in the form of a radio base station includes a radio subsystem with two or more antennas diverse in one or more of the following: space, pattern, and polarization. The radio subsystem includes an external antenna switch for creating antenna diversity.

The antenna switch is controlled by a PIO port on a processor in the base unit. When an estimate of NEAR/FAR is desired, the base antenna connector is switched between antennas and an RSSI measurement is made for each antenna. Due to the diversity of the antennas, signal nulls and peaks due to multi-path are not expected to occur for all antennas at the same time. The result is that a FAR state is declared only when both antennas agree that the mobile radio state is FAR. A NEAR state is declared only when both antennas agree that the mobile radio state is NEAR. In this manner, adverse effects of nulls and peaks are reduced.

In one example of the invention, the base radio is in the form of a USB dongle and includes a first antenna and a second antenna. The second antenna is connected to the base radio with a coaxial cable and placed at a location remote from the first antenna, such as near a display device. In this manner, spatial diversity is provided. The second antenna can be attached to the USB device, free standing on a stand, built into another component like a PC camera or clipped to the display device, for example. In this manner, the spatial diversity between the first and second antenna operates to eliminate the adverse affect of a null of a single antenna. In a further example, the mobile radio rather than the base radio has two different antennas to provide the desired antenna diversity.

In one example, a method for determining a near state or a far state of a mobile radio in relation to a base radio includes measuring a first RSSI signal using a first antenna associated with a base radio and measuring a second RSSI signal using a second antenna associated with the base radio. For example, the mobile radio may be a wireless headset and the base radio may be a wireless headset base station. A first state indication is generated utilizing the first RSSI signal, where the first state indication includes a first near state indication or a first far state indication. A second state indication is generated utilizing the second RSSI signal, where the second state indication includes a second near state indication or a second far state indication. The method further includes generating a third state indication, including either a third near state indication or a third far state indication, responsive to comparing the first state indication to the second state indication.

In one example, a wireless device includes a computer interface, a first antenna, a second antenna, and an antenna switch for switching between the first antenna and the second antenna. The wireless device includes a wireless transceiver for sending and receiving signals using the first antenna or the second antenna, and a processor. The wireless device further includes a computer readable memory storing a first set of instructions that when executed by the processor cause the wireless device to receive a first signal using the first antenna and receive a second signal using the second antenna, and a second set of instructions that when executed by the processor generate a near state indication or a far state indication utilizing a first signal RSSI and a second signal RSSI.

In one example, a wireless device includes a first antenna to receive a first signal from a wireless mobile radio, a second antenna to receive a second signal from the wireless mobile radio, a switch to alternate between use of the first antenna and the second antenna to receive signals, and a wireless transceiver to send and receive signals using the first antenna or the second antenna. The wireless device further includes a near/far state determination module for generating a near state indication or a far state indication by comparing a first signal RSSI and a second signal RSSI to a near/far threshold RSSI.

Figure 1:
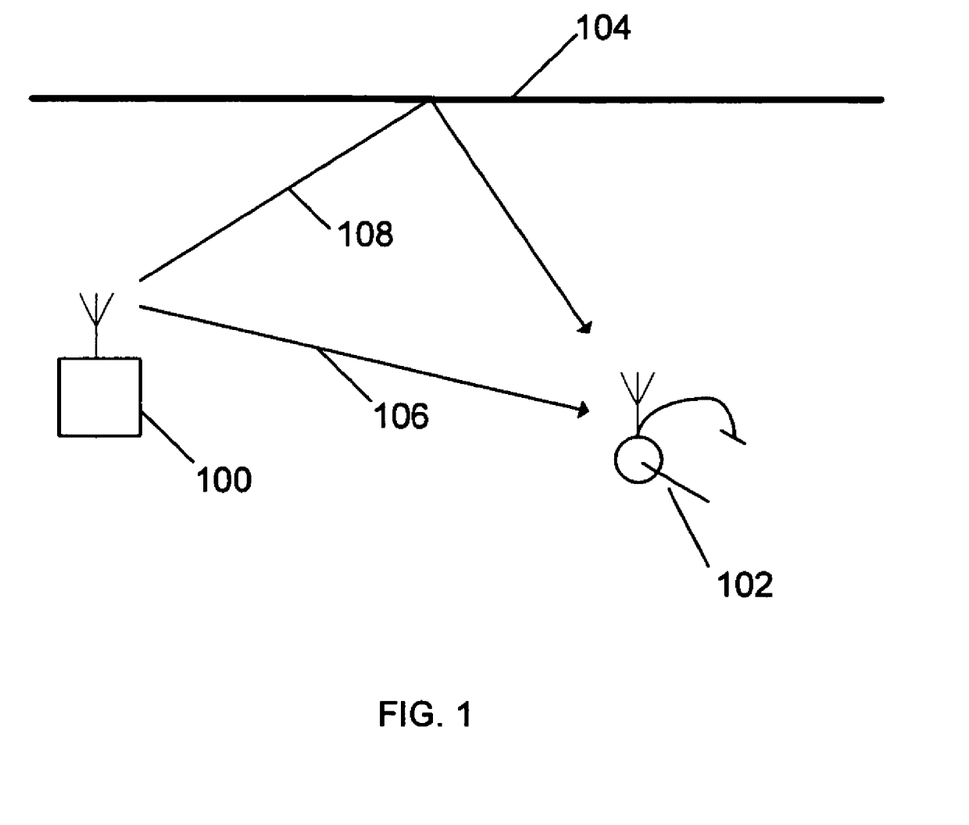
FIG. 1 is a diagram illustrating direct and reflected path lengths for a headset located at a different distance from its radio base station.

FIG. 1 is a diagram illustrating direct and reflected path lengths for a headset located at a distance from its radio base station. The simplified system shown in FIG. 1 includes a base station 100 that is the source of a radio signal, a headset 102 and a reflecting surface 104. The signal received at headset 102 is the vector sum of a direct-path signal and a reflected-path signal. As shown in FIG. 1, the signal received at headset 102 is the vector sum of the direct-path signal 106 and reflected-path signal 108. When the relative path lengths are such that the direct-path signal 106 and reflected-path signal 108 arrive in phase, the resultant sum is additive and the received signal level is higher than for just the direct path alone. This may result in a signal peak that is not indicative of the distance between base station 100 and headset 102. When the direct and reflected signals arrive out of phase the resultant sum is subtractive and the received signal level is less than for just the direct path alone. This attenuation may result in a signal null that is not indicative of the distance between base station 100 and headset 102.

Figure 2:
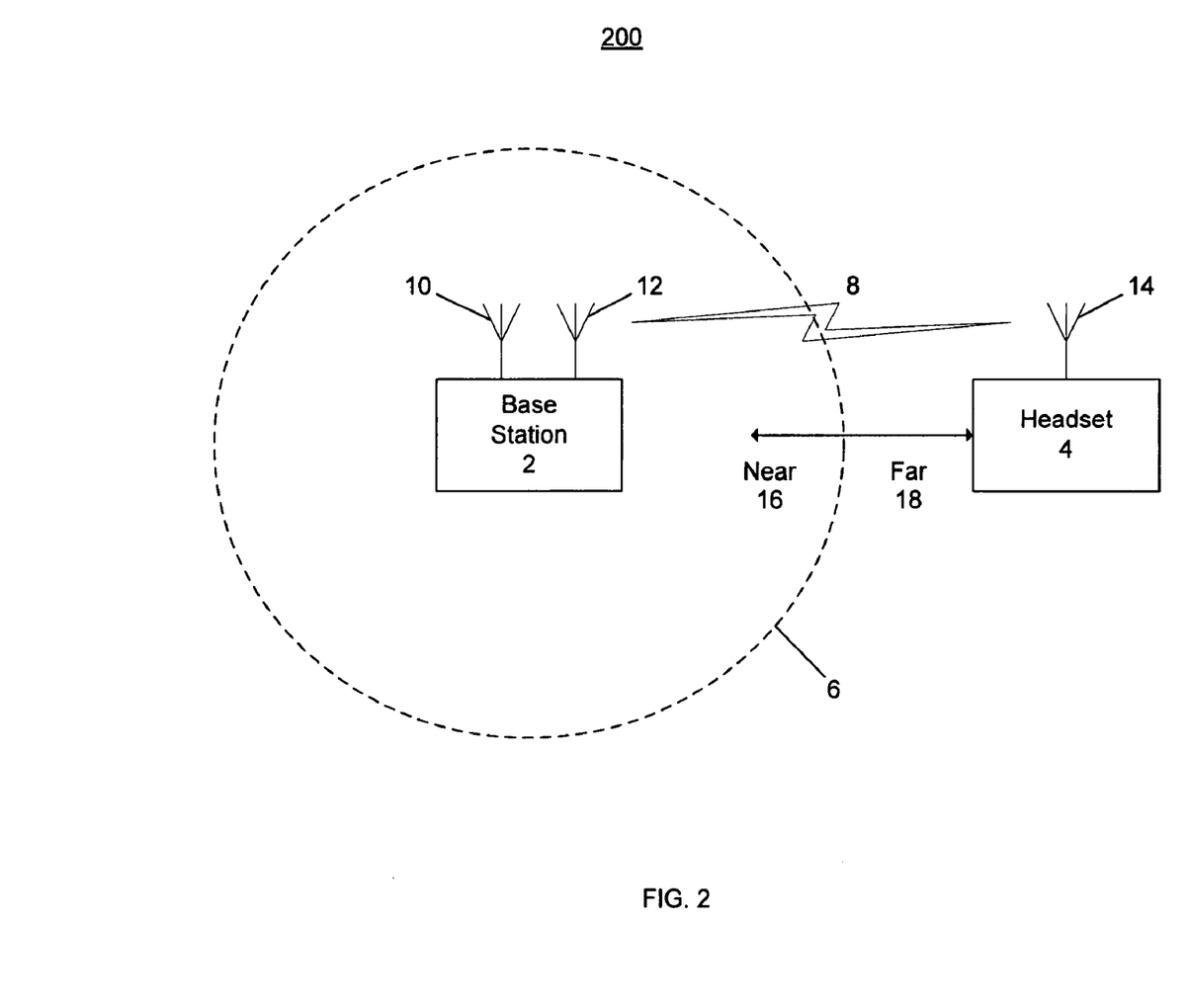
FIG. 2 illustrates NEAR/FAR sensing of a headset in relation to a base station.

FIG. 2 illustrates NEAR/FAR sensing of a headset in relation to a base station. The term "headset" refers to any type of device which may be worn or mounted on a user's head. FIG. 2 is a drawing illustrating how RSSI may be employed to determine proximity of a headset to a wireless base station, in accordance with an aspect of the present invention. A system 200 includes a headset 4 and a base station 2 capable of wireless communication there between. Base station 2 is coupled to a telecommunications network, either directly or indirectly via a computing device. In one example, base station 2 may be used to route calls to multiple wireless headsets. The base station 2 includes an antenna 10 and an antenna 12. The headset 4 includes an antenna 14. The received signal strength indicator (RSSI) of the wireless link 8 is measured and monitored to determine the proximity of the headset 4 from the base station 2 using both antenna 10 and antenna 12.

The RSSI can be measured and monitored either at the headset 4 or at the base station 2. If measured and monitored at the headset 4, the base station 2 can be configured to query the headset 4 as to what the RSSI is for a signal associated with antenna 10 and a signal associated with antenna 12. Then, the RSSIs for the two signals are used to determine proximity between headset 4 and base station 2. Antenna 10 and antenna 12 may be any type of antenna typically used in mobile applications, including whip-monopoles, PIFA, and PCB resonators.

In system 200, a NEAR/FAR boundary 6 establishes a range from base station 2 below which headset 4 is considered to be in a NEAR state 16 and beyond which headset 4 is considered to be in a FAR state 18. System 200 utilizes RSSI values measured through both antenna 10 and antenna 12 to determine NEAR state and FAR state using methods described herein.

Figure 3:
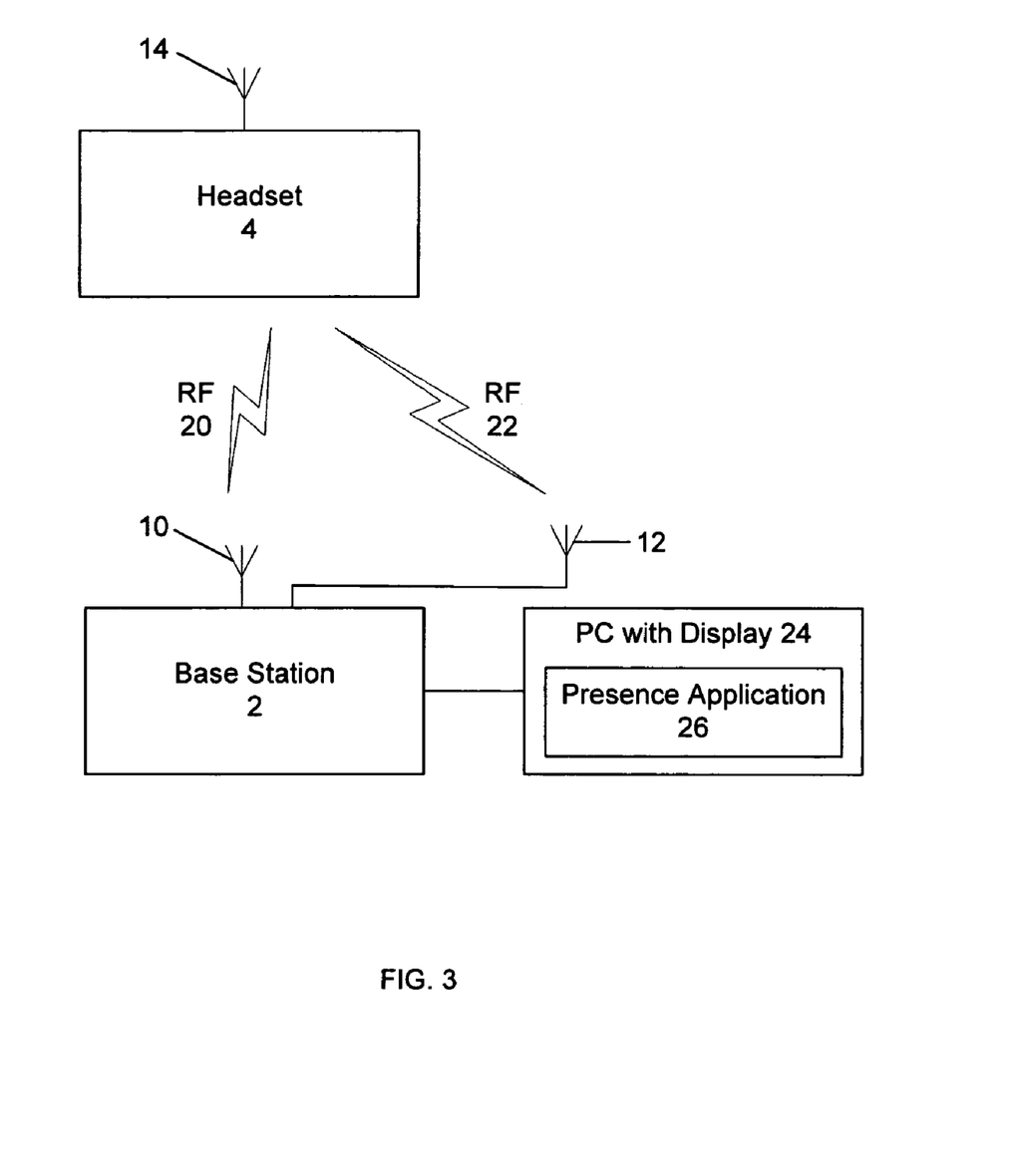
FIG. 3 illustrates a system for NEAR/FAR sensing of a headset in relation to a base station in one example implementation of the system shown in FIG. 2.

FIG. 3 illustrates a system for NEAR/FAR sensing of a headset in relation to a base station in one example implementation of system 200 shown in FIG. 2. Referring to FIG. 3, base station 2 is coupled to a personal computer with display 24 executing a presence application 26. For example, presence application 26 may be configured to communicate proximity and usage state information of the headset 4 over a network to which personal computer 24 is connected. In a further example, the personal computer 24 may be replaced with a mobile handset executing presence application 26, whereby the mobile handset is connected to a network using, for example, WiFi or General Packet Radio Services (GPRS). Further details regarding use of presence applications can be found in the commonly assigned and co-pending U.S. patent application entitled "Headset-Derived Real-Time Presence and Communication Systems and Methods" application Ser. No. 11/697,087, which was filed on Apr. 5, 2007, and which is hereby incorporated into this disclosure by reference for all purposes.

In one example, base station 2 is coupled to personal computer with display 24 using a USB interface. Antenna 12 of base station 2 extends away from the base station housing a cable or other conductive wire. Antenna 12 is spatially diverse from antenna 10 and can be positioned as desired. The spatial diversity only requires separation of antenna 12 from antenna 10 on the order of a wavelength apart. In the example shown in FIG. 3, antenna 12 is located in the vicinity of personal computer with display 24. The antenna 12 may be placed within the housing of the personal computer with display 24 or other devices within the vicinity to make it unobtrusive and provide polarization diversity. Headset 4 is in communication with base station 2 using either an RF link 20 through antenna 10 or using an RF link 22 through antenna 12.

Figure 7:
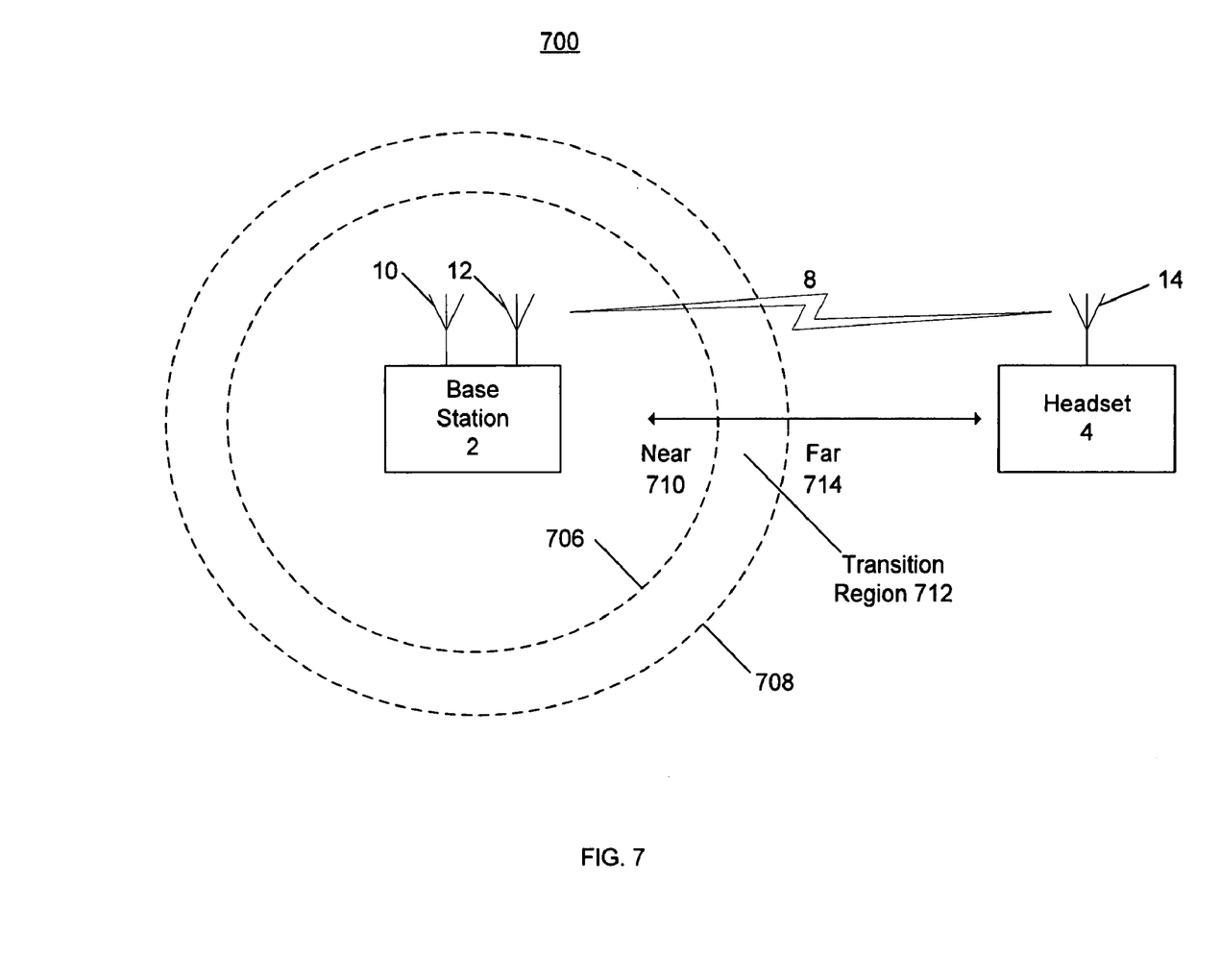
FIG. 7 illustrates NEAR/FAR sensing of a headset in relation to a base station in a further example where the headset may be in a transitional region not considered NEAR or FAR.

FIG. 7 illustrates NEAR/FAR sensing of a headset in relation to a base station, where the headset may be in a transitional region not considered NEAR or FAR. A system 700 includes a headset 4 and a base station 2 capable of wireless communication there between. Base station 2 is coupled to a telecommunications network, either directly or indirectly via a computing device. The base station 2 includes an antenna 10 and an antenna 12. The headset 4 includes an antenna 14. The received signal strength indicator (RSSI) of the wireless link 8 is measured and monitored to determine the proximity of the headset 4 from the base station 2 using both antenna 10 and antenna 12. The RSSIs for the two signals are used to determine proximity between headset 4 and base station 2.

In system 700, a NEAR boundary 706 establishes a range from base station 2 below which headset 4 is considered to be in a NEAR state 710. A FAR boundary 708 establishes a range from base station 2 beyond which headset 4 is considered to be in a FAR state 714. A transition region 712 beyond NEAR boundary 706 and closer than FAR boundary 708 establishes a range from base station 2 where the headset is not considered to be either NEAR or FAR. Where the headset is not considered to be NEAR or FAR, it may be deemed indeterminate and designated an "UNKNOWN" state, "NOT NEAR OR FAR", or other state/value. System 700 utilizes RSSI values measured through both antenna 10 and antenna 12 to determine NEAR state, FAR state, or UNKNOWN state using methods described herein.

Figure 4:
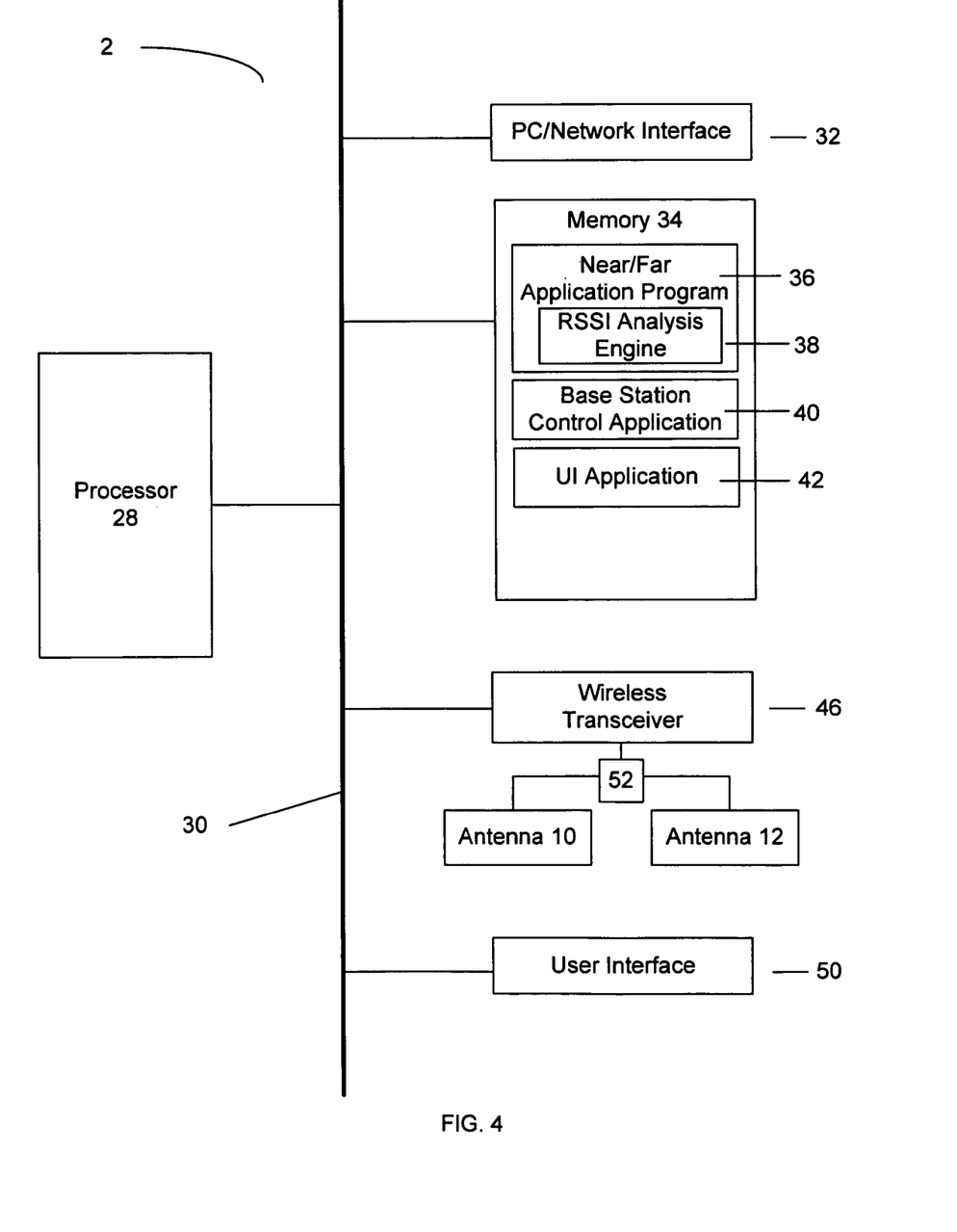
FIG. 4 illustrates a block diagram of a base station with a NEAR/FAR determination application.

FIG. 4 illustrates a block diagram of the base station 2 with a NEAR/FAR determination application. Referring now to FIG. 4 in conjunction with FIG. 2, a block diagram of an example of base station 2 is shown. Base station 2 includes a processor 28 operably coupled via a bus 30 to a computer readable memory 34, a wireless transceiver 46 and accompanying antenna 10 and antenna 12, a PC/network interface 32, and a user interface 50. Wireless transceiver 46 may for example, be a DECT transceiver, Bluetooth transceiver, or IEEE 802.11 transceiver. A processor controllable electronic switch 52 is utilized to switch between and thereby transmit and receive through either antenna 10 or antenna 12. The switch 52 may be contained within or be outside of wireless transceiver 46. Antenna 10 and antenna 12 may be diverse in space, radiation pattern, or polarization.

PC/network interface 32 may be a personal computer interface and/or network interface. For example, the network interface may be an interface to a public switched telephone network, integrated services digital network, local area network, or wireless local area network. In one example, the PC interface is a USB interface. In one example, base station 2 includes a housing and a conductor cable extending away from the base housing and coupled to the antenna 12, where antenna 12 is at a distance from the base housing.

Processor 28 allows for processing data, in particular managing RSSI data between wireless transceiver 46 and memory 34 for determining the NEAR/FAR state of base station 2. Processor 28 may include a variety of processors (e.g., digital signal processors), with conventional CPUs being applicable.

Computer readable memory 34 may include a variety of memories, and in one example includes SDRM, ROM, flash memory, or a combination thereof. Computer readable memory 34 may further include separate memory structures or a single integrated memory structure. In one example, computer readable memory 34 may be used to store passwords, network and telecommunications programs, and/or an operating system (OS).

Computer readable memory 34 stores a NEAR/FAR application program 36 executed by processor 28 to determine NEAR/FAR state of the headset 4 relative to the base station 2. NEAR/FAR application program 36 includes an RSSI analysis engine 38, the operation which is described in further detail below. Memory 34 may store RSSI values for use by NEAR/FAR application program to determine the NEAR/FAR state of the headset 4 relative to the base station 2. Memory 34 also includes a base station control application 40 and a user interface application 42. User interface 50 allows for manual communication between the base station user and the base station, and in one example includes an audio and/or visual interface.

In one example operation, NEAR/FAR application program 36 causes the headset base station 2 to receive a first signal using antenna 10 and then switch to antenna 12 using switch 52 to receive a second signal. NEAR/FAR application program 36 then generates a NEAR state indication or a FAR state indication using RSSI analysis engine 38 by comparing the first signal RSSI and the second signal RSSI to a NEAR/FAR threshold RSSI. The NEAR/FAR threshold RSSI is a value above which a headset is in a NEAR state and below which the headset is in a FAR state. As described in reference to Transition Table A and Transition Table B below, the process for determining a NEAR state indication or a FAR state indication may vary. Switching between antenna 10 and antenna 12 is performed as rapidly and rarely as possible to minimize time transmitting or receiving using the antenna with the lower RSSI. The RSSI sampling can occur as a normal part of the transceivers pre-existing diversity antenna algorithm used to optimize received signal integrity and merely reported to the NEAR/FAR application, but can also occur as an autonomous switching operation by the NEAR/FAR application on a non-diversity-aware transceiver system. After the NEAR/FAR determination, the switch 52 is positioned so that the antenna with the best RSSI is used, which again may occur automatically for a pre-existing diversity-antenna transceiver system.

In further examples, a NEAR/FAR determination application can reside on either or both the headset and the base station. Regardless of where the NEAR/FAR determination application resides, the result of a NEAR/FAR determination may be sent to the other device.

In one example, base station 2 is an access point (AP), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or voice over internet protocol (VoIP). In one example, the access point includes a transceiver and a processor configured to allow a wireless device (e.g., a headset) access to a network connected to the access point (e.g., via a 10/200 Ethernet RJ-45 port). The AP may be any device that allows wireless-equipped computers and other devices to communicate with a wired network. In one example, the AP is able to support WiFi in general, and the 802.11a, 802.11b, 802.11g, and/or 802.11n wireless networking standards in particular. In other examples, the AP may be able to support other wireless networking standards.

Figure 5:
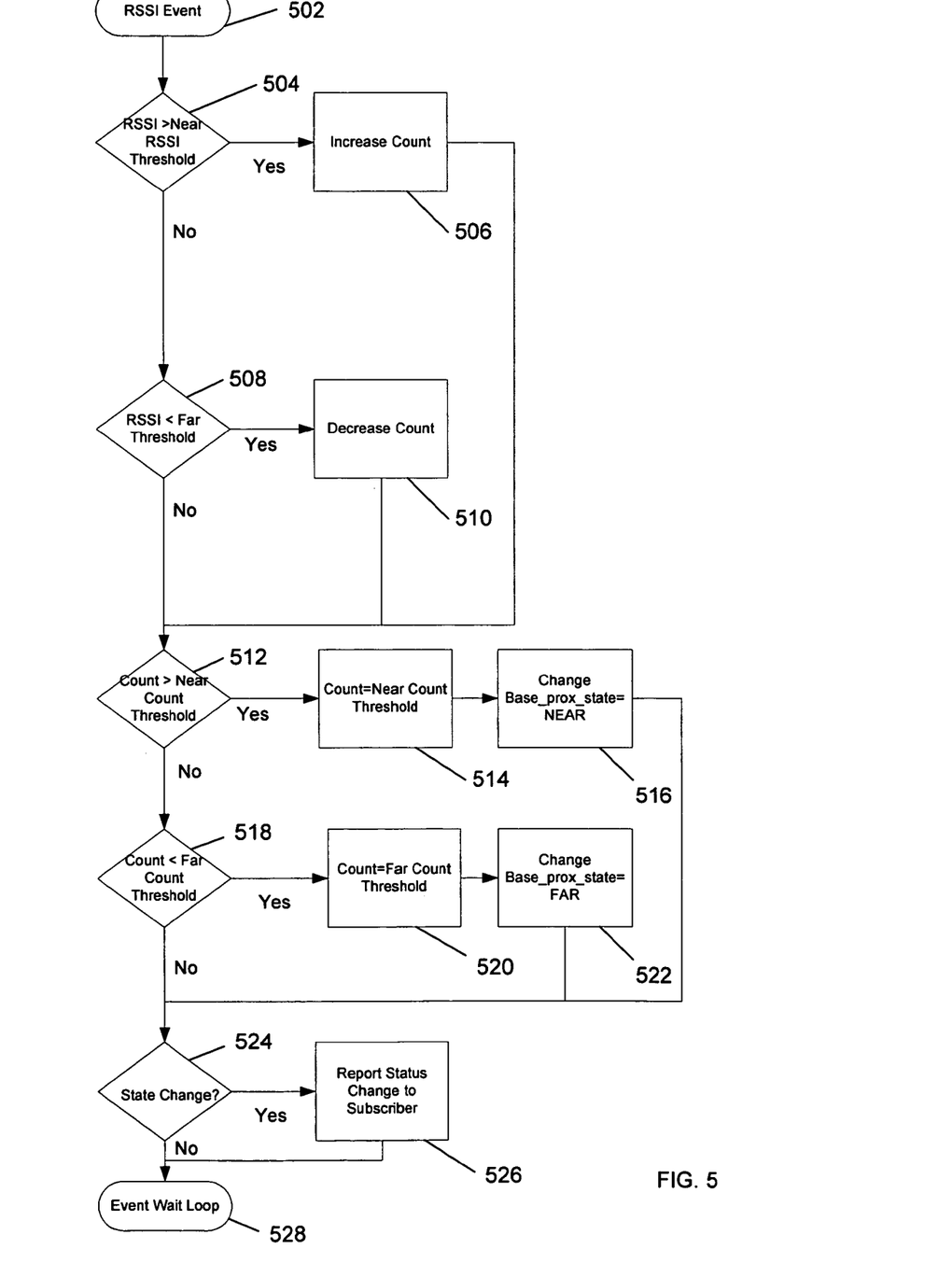
FIG. 5 is a flowchart illustrating a process by which hysteresis is used in a NEAR/FAR state determination.

In one example, when the NEAR/FAR state determination is made at each antenna, hysteresis is used in the determination to prevent rapid toggling between NEAR state and FAR state. FIG. 5 is a flowchart illustrating a process by which hysteresis is used in a NEAR/FAR state determination. The RSSI process set forth allows for eliminating flickering states by requiring multiple reads of identical values.

A NEAR RSSI threshold is pre-determined, and measured RSSI values must be above this NEAR RSSI threshold for a pre-determined NEAR count threshold number of times before a state change to NEAR state occurs. Similarly, a FAR RSSI threshold is predetermined, and measured RSSI values must be less than this FAR RSSI threshold for a pre-determined FAR count threshold number of times before a state change to FAR state occurs. Referring to FIG. 5, at block 502, an RSSI event occurs whereby an RSSI is measured. At block 504, it is determined whether the measured RSSI is greater than a NEAR RSSI Threshold. If yes, then at block 506 a count variable is increased by one. Following block 506, at decision block 512, it is determined whether the count variable is greater than a NEAR Count Threshold. If no at decision block 504, at decision block 508, it is determined if the measured RSSI is less than a FAR RSSI threshold. If yes at decision block 508, then the count variable is decreased by one.

Following block 510, the process proceeds to decision block 512. If the count variable is greater than the NEAR count threshold at decision block 512, then at block 514, the count variable is set to the NEAR Count Threshold. Following block 514, at block 516, the base proximity state (Base_prox_state) is set to NEAR state. If no at decision block 512, at decision block 518 it is determined if the count variable is less than a FAR Count Threshold. If yes at decision block 518, then at block 520, the count variable is set to the FAR Count Threshold. At block 522, the base proximity state Base_prox_state is set to FAR state. If no at decision block 518, or following block 516 or block 522, at decision block 524 it is determined whether a state change has occurred. If yes at decision block 524, at block 526 the state change is reported. If no at decision block 524 or following block 526, at block 528 the event wait loop repeats. Using this hysteresis, false NEAR/FAR transitions due to multipath are reduced.

Figure 6:
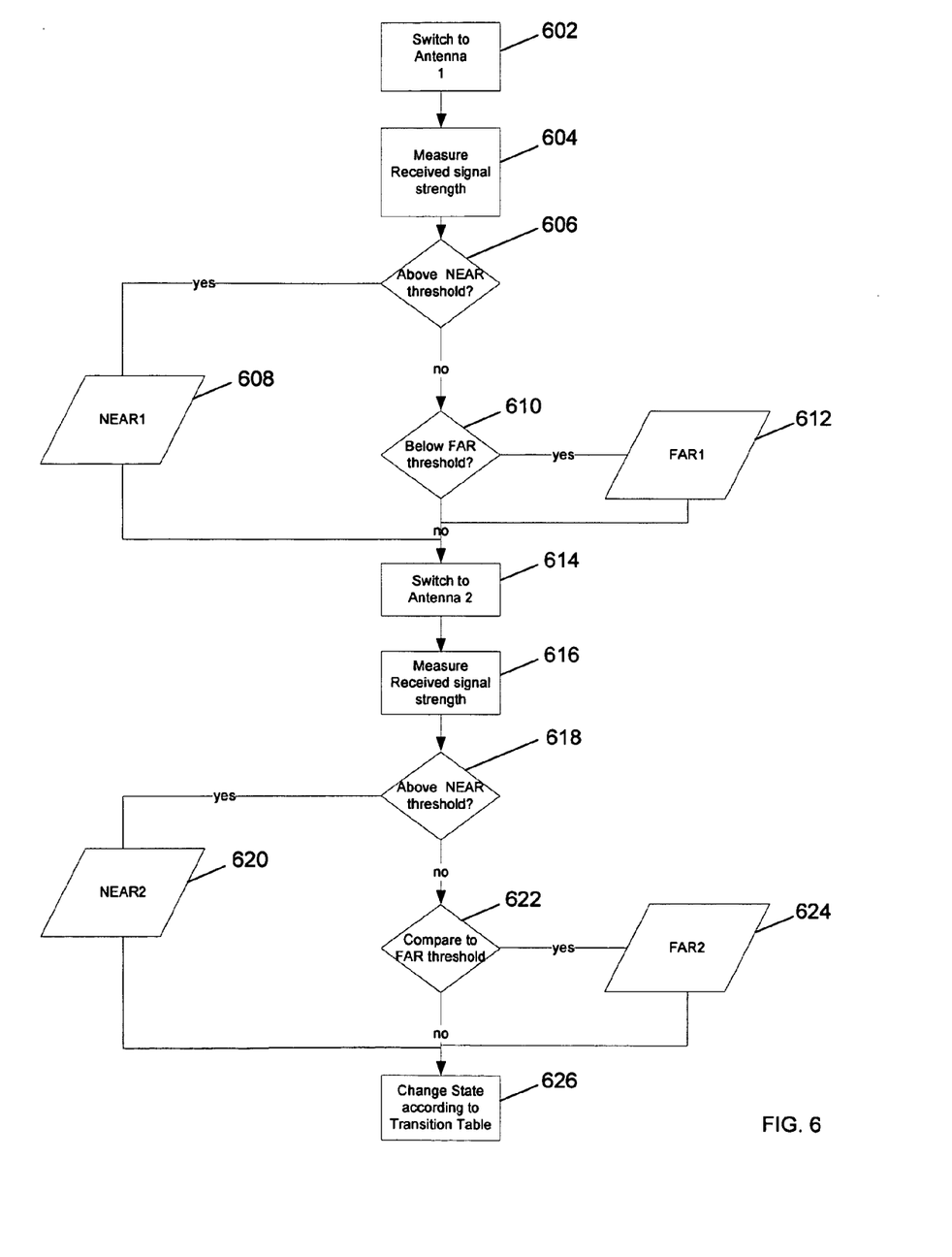
FIG. 6 is a flowchart illustrating a process by which the NEAR/FAR application determines NEAR/FAR state using antenna diversity in one example.

FIG. 6 is a flowchart illustrating a process by which the NEAR/FAR application determines NEAR/FAR state in one example. The process set forth in FIG. 6 may be modified to utilize the hysteresis process set forth in FIG. 5 for each antenna to determine state. In this example, antenna diversity is utilized to generate a NEAR/FAR determination with improved reliability and accuracy. RSSI measurements are made using an antenna 1 to determine a first state indication of either a NEAR1 state indication or a FAR1 state indication. In certain examples, an UNKNOWN1 state indication may also be used where the measured RSSI falls into a range between a NEAR state threshold and a FAR state threshold. Alternatively, a single NEAR/FAR threshold value is used above which a headset is in a NEAR state and below which the headset is in a FAR state.

RSSI measurements are also made using an antenna 2 to determine a second state indication of either a NEAR2 state indication or a FAR2 indication. In certain examples, an UNKNOWN2 state indication may also be used where the measured RSSI falls into a range between a NEAR state threshold and a FAR state threshold. Alternatively, a single NEAR/FAR threshold value is used above which a headset is in a NEAR state and below which the headset is in a FAR state.

The first state indication generated through use of antenna 1 and second state indication using antenna 2 are then compared to generate a more reliable NEAR or FAR state indication. In one example, an UNKNOWN state indicator may also be generated as described below.

Referring to FIG. 6, at block 602, a base station switches to an antenna 1 and transmissions between a headset and the base station begin. At block 604, the RSSI is measured for the signal received at the antenna 1 and stored in memory. At decision block 606 it is determined whether the measured RSSI is above a NEAR threshold value. If yes at decision block 606, at block 608 a NEAR1 state indicator is output and stored in memory as the first state indicator. If no at decision block 606, at decision block 610 it is determined whether the measured RSSI is below a FAR threshold value. If yes at decision block 610, at block 612 a FAR1 state indicator is output and stored in memory as the first state indicator.

At block 614, the base station switches to an antenna 1 diverse from antenna 2 and transmissions between the headset and the base station begin using antenna 2. At block 616, the RSSI is measured for the signal received at the antenna 2 and stored in memory. At decision block 618 it is determined whether the measured RSSI is above a NEAR threshold value. If yes at decision block 618, at block 620 a NEAR2 state indicator is output and stored in memory as the second state indicator. If no at decision block 618, at decision block 622 it is determined whether the measured RSSI is below a FAR threshold value. If yes at decision block 622, at block 624 a FAR2 state indicator is output and stored in memory as the second state indicator.

At block 626, the first state indicator and the second state indicator are compared to generate a new NEAR state, FAR state, or UNKNOWN state. In one example, the logic set forth in Transition Table A or Transition Table B set forth below is used. In further examples, the new NEAR state, FAR state, or UNKNOWN state may be determined by applying different logic to the first state indicator and second state indicator. For example, a new NEAR state may be generated if and only if both the first state indicator is NEAR1 and the second state indicator is NEAR2, and a new FAR state is generated if and only if the first state indicator is FAR1 and the second state indicator is FAR2. The order in which the first state indicator and the second state indicator are determined may be modified in further examples.

Transition Table A and Transition Table B are transition tables illustrating determining a new NEAR/FAR state ("New State") based in part upon a prior NEAR/FAR state ("Previous State") and a present measured NEAR/FAR state ("Measurement") in two examples. For example, Transition Table A and Transition Table B may be stored in memory at base station 2. In further examples, other transition tables may be used that utilize different logic to determine the new NEAR/FAR state based upon prior NEAR/FAR state and/or present measured NEAR/FAR state. The present measured NEAR/FAR state using antenna diversity with an antenna 1 and antenna 2 is determined, for example, using the process set forth in FIG. 6.

| Transition Table A | | |
| --- | --- | --- |
| Previous State | Measurement | New State |
| Near | NEAR1 and NEAR2 | Near |
|  | FAR1 and FAR2 | Far |
|  | All other values | Near |
| Far | NEAR1 and NEAR2 | Near |
|  | FAR1 and FAR2 | Far |
|  | All other values | Far |
| Unknown | NEAR1 and NEAR2 | Near |
|  | FAR1 and FAR2 | Far |
|  | All other values | Unknown |

Transition Table A includes a Previous State column, Measurement column, and New State column. The Measurement column includes the first state indicator data and the second state indicator data. The New State column is the result of logic applied to the contents of the Previous State column and the Measurement column. The Transition Table A utilizes logic so that the prior NEAR/FAR state is maintained unless there is a high reliability the new NEAR/FAR state is correct. This is used to prevent undesirable switching due to transient changes of NEAR/FAR.

| Transition Table B | | |
| --- | --- | --- |
| Previous State | Measurement | New State |
| Near | NEAR1 and NEAR2 | Near |
|  | FAR1 and FAR2 | Far |
|  | All other values | Unknown |
| Far | NEAR1 and NEAR2 | Near |
|  | FAR1 and FAR2 | Far |
|  | All other values | Unknown |
| Unknown | NEAR1 and NEAR2 | Near |
|  | FAR1 and FAR2 | Far |
|  | All other values | Unknown |

Transition Table B includes a Previous State column, Measurement column, and New State column. The Measurement column includes the first state indicator data and the second state indicator data. The New State column is the result of logic applied to the contents of the Previous State column and the Measurement column. Transition Table B utilizes logic so that the new NEAR/FAR state is determinate (i.e., not unknown) only when there is a high reliability of the accuracy of the new NEAR/FAR determination. Transition Table B may be used in applications which require higher fidelity on NEAR/FAR state, such as in security system or game applications.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Although described in certain examples herein as determining a NEAR state or a FAR state of a head mounted device such as a headset in relation to a base unit, the methods and systems described herein may be used to determine a NEAR state or FAR state between any two radio devices. For example, the methods and systems described herein may be applied to other body worn or carried devices in addition to headsets. Furthermore, the functionality associated with any blocks described above may be centralized or distributed. It is also understood that one or more blocks may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for determining a near state or a far state of a mobile radio in relation to a base radio comprising:
    measuring a first RSSI signal using a first antenna associated with a base radio;
    measuring a second RSSI signal using a second antenna associated with the base radio;
    generating a first state indication utilizing the first RSSI signal comprising a first near state indication or a first far state indication;
    generating a second state indication utilizing the second RSSI signal comprising a second near state indication or a second far state indication;
    generating a third state indication comprising a third near state indication or a third far state indication responsive to comparing the first state indication to the second state indication.

2. The method of claim 1, wherein generating a third state indication further comprises comparing the first state indication and the second state indication to a prior state indication.

3. The method of claim 1, wherein the third, state indication comprises a third near state indication where the first state indication comprises a first near state indication and the second state indication comprises a second near state indication, and the third state indication comprises a third far state indication where the first state indication comprises a first far state indication and the second state indication comprises a second far state indication.

4. The method of claim 1, wherein measuring a first RSSI signal and measuring a second RSSI signal comprises receiving the first RSSI signal and the second RSSI signal in a Bluetooth system, IEEE 802.11 system, or DECT system.

5. The method of claim 1, wherein generating a. first state indication utilizing the first RSSI signal comprises comparing the first RSSI signal to a near/far threshold RSSI value, and generating a second state indication utilizing the second RSSI signal comprises comparing the second RSSI signal to the near/far threshold RSSI value.

6. The method of claim 5, wherein the near/far threshold RSSI value is a value above which a mobile radio is in a near state and below which the mobile radio is in a far state.

7. The method of claim 1, wherein generating a first state indication comprises employing a hysteresis to prevent rapid toggling between a first near state indication and first far state indication, and generating a second state indication comprises, employing a hysteresis to prevent rapid toggling between a second near state indication and a second far state indication.

8. The method of claim 1, wherein the base radio is coupled to a personal computer via a computer interface.

9. The method of claim 8, wherein the computer interface is a USB interface.

10. The method of claim 1, wherein the first antenna and the second antenna are diverse in space, radiation pattern, or polarization.

11. The method of claim 1, wherein generating a first state indication utilizing the first RSSI signal further comprises a first unknown state indication and generating a second state indication utilizing the second RSSI signal further comprises a second unknown state indication.

12. A wireless device, comprising:
a first antenna;
a second antenna;
an antenna switch for switching between the first antenna and the second antenna;
a wireless transceiver for sending and receiving signals using the first antenna or the second antenna;
a processor; and
a computer readable memory storing a first set of instructions that when executed by the processor cause the wireless device to receive a first signal using the first antenna and receive a second signal using the second antenna, and a second set of instructions that when executed by the processor generate a near state indication or a far state indication utilizing a first signal RSSI and a second signal RSSI.

13. The wireless device of claim 12, further comprising a network interface.

14. The wireless device of claim 13, wherein the network interface comprises an interface to a public switched telephone network, integrated services digital network, local area network, or wireless local area network.

15. The wireless device of claim 12, wherein the wireless transceiver comprises a DECT transceiver, Bluetooth transceiver, or IEEE 802.11 transceiver.

16. The wireless device of claim 12, further comprising a computer interface.

17. The wireless device of claim 12, further comprising:
a base housing; and
a conductor cable extending away from the base housing and coupled to the second antenna, wherein the second antenna is at a distance from the base housing.

18. The wireless device of claim 12, Wherein the first antenna and the second antenna are diverse in space, radiation pattern, or polarization.

19. The wireless device of claim 12, wherein the near state indication or the far state indication is generated by comparing the first signal RSSI and the second signal RSSI to a near/far threshold RSSI.

20. The wireless device of claim 19, wherein the near/farthreshold RSSI is a value above which a headset is in a near state and below which the headset is in a far state.

21. A wireless device comprising:
a first antenna to receive a first signal from a second wireless device;
a second antenna to receive a second signal from the second wireless device;
a wireless transceiver to send and receive signals using the first antenna or the second antenna;
a near/far state determination module for generating a near state indication or a far state indication by comparing a first signal. RSSI and a second signal RSSI to a near/far threshold RSSI.

22. The wireless device of claim 21, further comprising a computer interface to couple the wireless device to a.computer.

23. The wireless device of claim 21, further comprising a network interface to couple the wireless device to a communications network.

24. The wireless device of claim 21, further comprising:
a housing for storing the first antenna, the wireless transceiver; and the near/far state determination module; and
a cable extending away from the housing, the cable coupled to the second antenna for placing the second antenna at a distance from the housing.

* * * * *